United States Patent
Villar et al.

[11] Patent Number: 6,153,562
[45] Date of Patent: Nov. 28, 2000

[54] CEMENTING SLURRY AND METHOD OF DESIGNING A FORMULATION

[75] Inventors: John Villar, Bergen, Norway; Jean-Francois Baret, Paris, France

[73] Assignee: Schlumberger Technology Corporation, Sugar Land, Tex.

[21] Appl. No.: 08/943,565

[22] Filed: Oct. 3, 1997

[51] Int. Cl.$^7$ .............................. C09K 3/00; C04B 7/00
[52] U.S. Cl. ...................... 507/269; 507/906; 106/816
[58] Field of Search ................................... 507/269, 906; 106/816; 166/285

[56] References Cited

U.S. PATENT DOCUMENTS

| | | | |
|---|---|---|---|
| 4,333,765 | 6/1982 | Shaw | 106/816 |
| 5,151,203 | 9/1992 | Riley et al. | 507/269 |
| 5,234,754 | 8/1993 | Bache | 106/816 |
| 5,489,574 | 2/1996 | Miano et al. | 507/269 |
| 5,522,926 | 6/1996 | Richard et al. | 106/816 |
| 5,569,324 | 10/1996 | Totten et al. | 106/816 |
| 5,571,318 | 11/1996 | Griffith et al. | 106/816 |
| 5,641,815 | 6/1997 | Fehlmann | 106/816 |

FOREIGN PATENT DOCUMENTS

| 0 621 247 | 10/1994 | European Pat. Off. . |
|---|---|---|
| 2294693 | 5/1996 | United Kingdom . |
| WO 9011977 | 10/1990 | WIPO . |

OTHER PUBLICATIONS

Database WPI, Week 9519, Derwent Publications Ltd., London, GB; An 95–145613, XP002033057 & SU 1 837 056 A (Town Equip Res Des Inst) *abstract*.

*Primary Examiner*—Philip Tucker
*Attorney, Agent, or Firm*—Gordon G. Waggett; Robin C. Nava

[57] ABSTRACT

The present invention provides a cementing composition for an oil or analogous well, essentially constituted by a solid fraction suspended in a liquid medium. The solid fraction is constituted by a coarse fraction with a packing volume fraction $\Phi_1$ which, according to the invention, is maximised, and a fines fraction x with a packing volume fraction $\Phi_2$ which is less than or equal to the volume fraction $x_0$ such that $$x_0 = \frac{\Phi_2(1 - \Phi_1)}{\Phi_1 + \Phi_2(1 - \Phi_1)}$$

The invention also provides a method of maximising the value of $\Phi_1$. The invention can minimise fluid loss whatever the materials selected for a cementing composition.

10 Claims, 2 Drawing Sheets

CEMENTING SLURRY AND METHOD OF DESIGNING A FORMULATION

The present invention relates to cementing slurries, particularly for cementing wells such as oil, gas, water, geothermal, or analogous wells. More precisely, the invention concerns a simple method of formulating slurry formulations which are highly insensitive to fluid loss.

Wells which pass through underground formations, such as oil wells, are usually shored by a metal casing cemented to the hole wall. After the casing has been lowered, a cement slurry propelled by an inert fluid is pumped via the inside of the casing to the bottom of the well, and it rises towards the surface, pushing out the drilling mud, to fill the annular space between the casing and the wall. By setting and hardening, the cement both supports the casing mechanically and forms a seal between the various underground zones through which it passes.

The slurry can be exposed to extreme cycles of temperature and pressure: it can be freezing at the surface while the temperature at the well bottom is several hundreds of degrees.

A whole series of criteria must be taken into consideration when formulating a slurry, including the geometry of the well, the characteristics of the drilling mud and other possible drilling fluids, the geological characteristics of the formations through which it passes, etc., in order to optimise the slurry, and in particular the rheology thereof.

This problem—which is further complicated as some of these characteristics are not always known as accurately as might be desired—is still further complicated when the composition of the slurry alters during the operation. This is particularly the case when the slurry loses part of its water, particularly when it comes into contact with permeable material such as a sand formation.

This phenomenon, known as fluid loss, has negative effects, firstly on the rheological properties of the slurry, in particular by reducing its fluidity which causes pumping difficulties and can even result in a blockage. However, above all, this phenomenon is directly associated with inability of the cement to oppose gas migration while the cement is setting, i.e., before it has set but during the time when the cement no longer behaves like a liquid which opposes gas migration by the hydraulic pressure exerted by the column of slurry, which is no longer sufficient to oppose such migration until the cement has set. This means that cement which is in the process of setting no longer forms a fluid-tight barrier.

In general, if a gas migration problem arises, cementing is carried out using a slurry with a fluid loss of less than 50 ml/30 min, measured under conditions recommended by the API (American Petroleum Institute). A fluid loss of his amount is about 10 to 15 times lower than that measured with an ordinary cement slurry, in the absence of any specific additive aimed at reducing fluid loss. Many such additives, known as fluid loss control agents, have been proposed, but the majority have disadvantages, in particular an influence on setting time and on slurry viscosity. Further, additives of different natures added to the cement slurries often have opposing effects.

French patent FR-A-2 704 218 has demonstrated that the quantities of additives which must be added can be substantially reduced by selecting the solid species in quantity and size ratios which correspond to well defined criteria. Specifically at least three solid species having disjoint grain-size curves are mixed together, with the ratios between those different solid species corresponding to a maximum packing volume fraction for the solid particles, and with a volume of liquid being added to form the slurry such that the slurry enters into a hindered settling state, in which the solid particles behave collectively like a porous solid material.

The concept discussed in the above patent leads to the production of slurries having remarkable properties, and in particular remarkable rheological properties and which, even with very small quantities of mixing fluid, are easy to mix and pump. The slurries obtained have relatively low fluid loss, even in the absence of any specific additive.

It has transpired that the compositions formulated using that concept can be still further improved from the point of view of fluid loss. However, that concept can only be applied when the materials selected for the solid phase have clearly disjoint grain sizes, which is far from always being the case.

The authors of the present invention set themselves the task of providing a means for determining which theoretical composition has the lowest possible fluid loss for any choice of material.

The aim of the invention is achieved by maximising the packing volume fraction $\Phi_1$ of the mixture constituted by the ensemble of all the solid species of a mixture, with the exception of the species constituted by the finest particles, and by selecting a solid volume fraction for the finest particles which is less than or equal to the volume fraction $x_0$ such that $$x_0 = \frac{\Phi_2(1-\Phi_1)}{\Phi_1 + \Phi_2(1-\Phi_1)}$$

where $\Phi_2$ is the packing volume fraction of the species constituted solely by the finest particles.

The authors of the present invention began by considering any cement slurry to be a suspension of a mixture of different solid particle species of different sizes in a liquid and by assuming that this mixture can always be reduced to a bimodal ensemble formed of the smallest species (the fines) and of the artificial species formed by the ensemble of all the other solid species (the coarse fraction), considered to be an indivisible whole.

By considering the smallest species to be constituted by particles which all have radius r and using a fluid loss model based on a network of capillaries between the particles, Poiseuille equations can be used to show that the fluid loss volume V can be expressed in the form of an equation of the type:

$$V = Kr \frac{1-\Phi}{\{x\Phi[1-(1-x)\Phi]\}^{1/3}} \sqrt{\frac{\Phi-\Phi_S}{\Phi_S}} \quad (1)$$

In this equation (1), K is a constant which only depends on factors which are not intrinsic to the slurry, $\Phi_S$ is the solid volume fraction in the slurry, $\Phi$ is the packing fraction (PVF) of the mixture and x is the solid volume fraction occupied by the fines. Calculations based on the bimodal assumption also allow the PVF $\Phi$ of the solid mixture of coarse particles and fines to be expressed in terms of the following equations:

$$\Phi = \frac{\Phi_1}{1-x} \quad \text{for } x < x_0, \text{ or} \quad (2)$$

$$\Phi = \frac{\Phi_2}{\Phi_2 + (1-\Phi_2)x} \quad \text{for } x > x_0, \text{ with} \quad (3)$$

-continued $$x_0 = \frac{\Phi_2(1-\Phi_1)}{\Phi_1 + \Phi_2(1-\Phi_1)} \quad (4)$$

where $\Phi_1$ et $\Phi_2$ respectively correspond to the packing volume fraction of the coarse particles and the fines. $x_0$ is the value at which the PVF of the mixture of coarse particles and fines is a maximum, or in other words, the most compact arrangement possible—always assuming that the coarse particles constitute a single indivisible species.

Since the finest particles are generally the most expensive particles, it is of particular advantage to ensure that the coarse particles are in excess ($x<x_0$). In this case, equation (1) can be reduced to an equation which depends on K, r, x, $\Phi_1$ and $\Phi$s only.

If the fine fraction is equivalent to an ensemble of same-diameter spherical particles, the value of $\Phi_2$ is then that of an arrangement of spheres of homogenous size, namely 0.64 (whatever the diameter of the particles). For less homogenous fractions which are nonetheless generally spherical, the value $\Phi_2$ is generally a little higher; in this case, experimental values are generally close to 0.70.

It should be noted that, while the value of $\Phi_2$ enters into the calculation of $x_0$, this value does not enter into the fluid loss volume. Similarly, it is not a case of maximising $\Phi$ (the PVF of the mixture of all the solid particles, both the fines and the coarse particles). In contrast, the fluid loss volume is proportional to the size of the fines. It appears from this analysis that, provided $\Phi_1$ is optimised, once the quantity of fines exceeds a certain threshold, i.e., it is relatively close to $x_0$ for fines fractions lower than $x_0$ or it is greater than $x_0$, variations in x have little effect on the fluid loss volume. In contrast, these fines must be as fine as possible. Preferably, the fines fraction of the solid mixture is constituted by solid particles with an average diameter which is less than $1\mu$, preferably less than $0.5\mu$ and more preferably less than $0.2\mu$. Preferably again, this fines fraction does not comprise particles with a size which exceeds the values indicated above. Particles with an average diameter of about $0.15\mu$ are more particularly preferred.

In order to formulate a cement slurry of the invention, different solid species are first selected and the corresponding grain-size distribution curves are obtained. Excluding the finest species, the proportions of each of these different species are then determined for which the maximum packing volume fraction can be obtained. Having optimised $\Phi_1$ and estimated $\Phi_2$, $x_0$ is easy to calculate.

The species constituting the coarse fraction of the mixture are selected such that the packing volume fraction $\Phi_1$ can be optimised up to a value greater than 0.80, preferably greater than 0.85, and more preferably greater than 0.90. This condition is generally satisfied only if the coarse fraction is constituted by at least two, and preferably at least three granulometrically distinct species.

Optimising $\Phi_1$, in other words determining the optimum volume fractions for each of the species in the coarse fraction of the mixture, can be effected using different known calculation methods which require only knowledge of the grain-size distribution of each of the species in the mixture.

When these various species have clearly disjointed grain-size distributions, which is particularly the case when the average diameters of the various species differ by a factor of 10 and when there is practically no overlap between the different grain-size curves, to a first approximation it is possible to ignore interactions between the particles. Because of this, the value of the packing volume fraction of the coarse particle mixture can be calculated in relatively simple fashion by imagining that packing is commenced by positioning the largest particles so that they form a continuous framework then filling the interstices with smaller particles, and so on, on each occasion filling the interstices left between the larger particles with particles that are smaller still. Details of this calculation method and the validity limits of this model can be found in the article by Do Ik Lee, *Packing of Spheres and its Effect on the Viscosity of Suspensions*, J. Paint Technol. (JPTYAX); 70; Vol.42 (550); pp.579–87.

When this multimodal model cannot be applied, in particular when the grain-size distribution curves of the various species of the mixture overlap, more complex models must be considered, such as that described Richard D. Sudduth, *A generalized model to predict the viscosity of solutions with suspended particles. IV Determination of optimum particle-by-particle volume fractions*, J. Appl. Polym. Sci. (JAPNAB,00218995); 94; Vol.52 (7); pp.985–96.

More simply, it is also possible to use the Andreassen model, as described in particular by A. H. M. Andreassen and J. Andersen, *Ueber die Beziehung zwischen Kornabstufung und Zwischenraum in Produkten aus losen Körnern (mit einigen Experimenten)*, Kolloid Z. 50 (1930) 217–228 [*the relationship between grain size distribution and interstices in loose grain products (with some experiments)*]. In this model, optimum packing is obtained when the particle size distribution of a mixture can be described by equation (5):

$F=(d/Dm)^q$ where F is the cumulative percentage (by volume) of particles which are smaller than d and $D_M$ is the maximum size of the particles in the mixture. The exponent q, or distribution coefficient, is lower when the mixture is depleted in very fine particles. Theoretically, this model assumes continuity of particle distribution from zero size. In practice, the authors of the present invention have found that it is satisfactory providing equation (5) has a distribution coefficient which is in the range 0.2 to 0.5—and preferably in the range 0.3 to 0.4—for values of d lying in the range $D_M$ to $d_m$ (the size of the smallest particles in the mixture).

Further details and advantageous features of the invention become apparent from the description below of tests carried out on different examples of additive compositions, made with reference to the figures in which:

Figure 1:
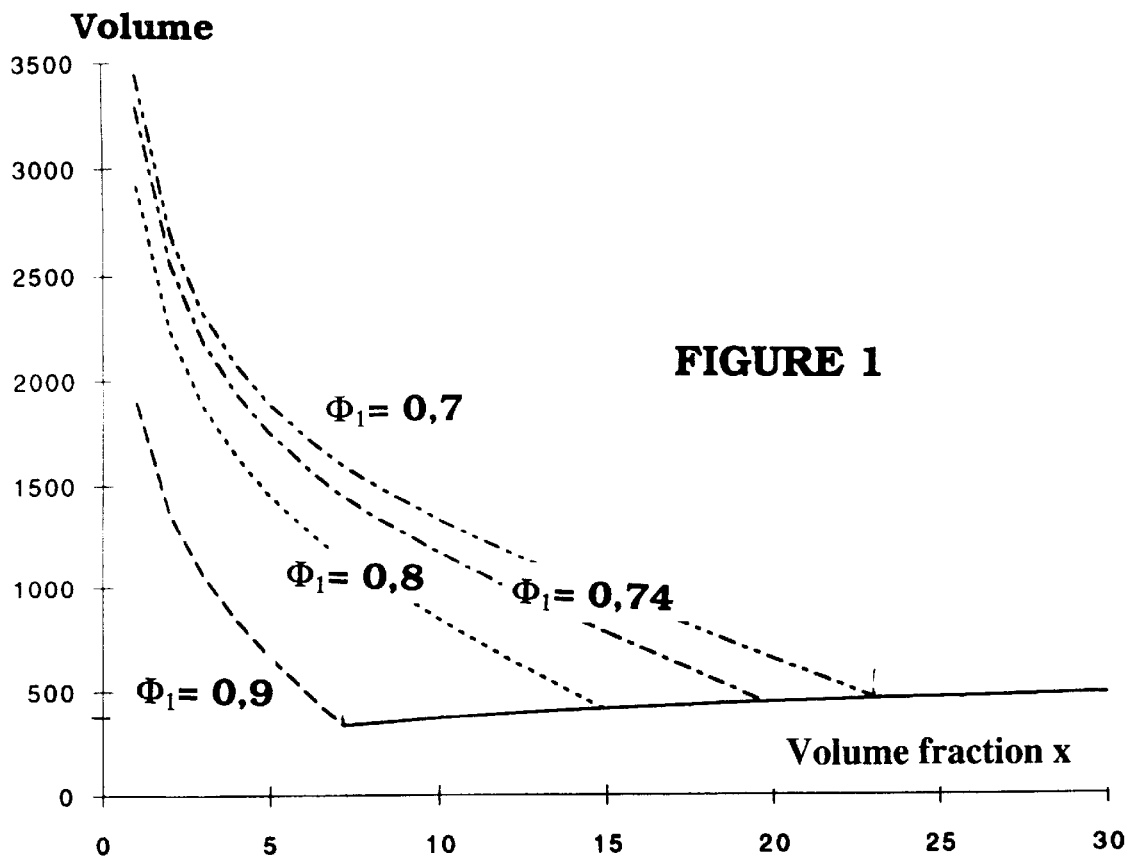
FIG. 1 is a curve showing the variation of the fluid loss volume (in ml) for various values of $\Phi_1$ as a function of the volume of carbon black added as fines.

Equation (1) was used to predict the fluid loss volume (in ml) for two types of fines fraction, assuming a porosity of 60% (in other words a value of $\Phi_s$ of 40%), as a function of the value of x, the percentage (by volume ) of fines in the solid fraction of the slurry. In the first case (FIG. 1), the fines fraction was constituted by carbon black particles with an average diameter of $2\mu$; the packing volume fraction $\Phi_2$ of these particles was estimated to be 0.70. In the second case (FIG. 2), the fines fraction was constituted by latex microspherules with an average diameter of $0.15\mu$; since these particles were very uniform in size, the packing volume fraction $\Phi_2$ for the latex was estimated to be 0.64.

This fines fraction was added to different types of coarse particle fractions, this latter term simply meaning that all of the solid species used to constitute such a fraction were larger in size than the carbon black particles.

Equation (1) was not applicable for near zero concentrations of fines, and so the curves were only traced out for fines volume fractions which were greater than or equal to 1%.

For volume fractions which are greater than $x_0$, equation (1) no longer depends on $\Phi_1$ but only on $\Phi_2$. In practice, the fluid loss volume no longer depends on the value of x, with only slight degradation of the slurry performances as x increases.

For fines volume fractions which are less than $x_0$, it can be seen that the fluid losses reduce very substantially as the quantity of fines added is increased, and this reduction is more rapid when the coarse particle fraction is in a more compact arrangement. Thus in the case of FIG. 1, for a coarse particle fraction in which the packing volume fraction $\Phi_1$ is 0.70 (which would, for example, correspond to a slurry constituted solely by fines and cement particles), minimal fluid losses are obtained for a fraction $x_0$ of 23%. If the value of $\Phi_2$ is increased, minimal losses are obtained for lower concentrations. Further, the fluid loss volume is slightly reduced. With carbon black, altering the value of $\Phi_2$ from 0.70 to 0.90 reduces the fluid loss to about 100 ml, using one third of the quantity of fines.

Figure 2:
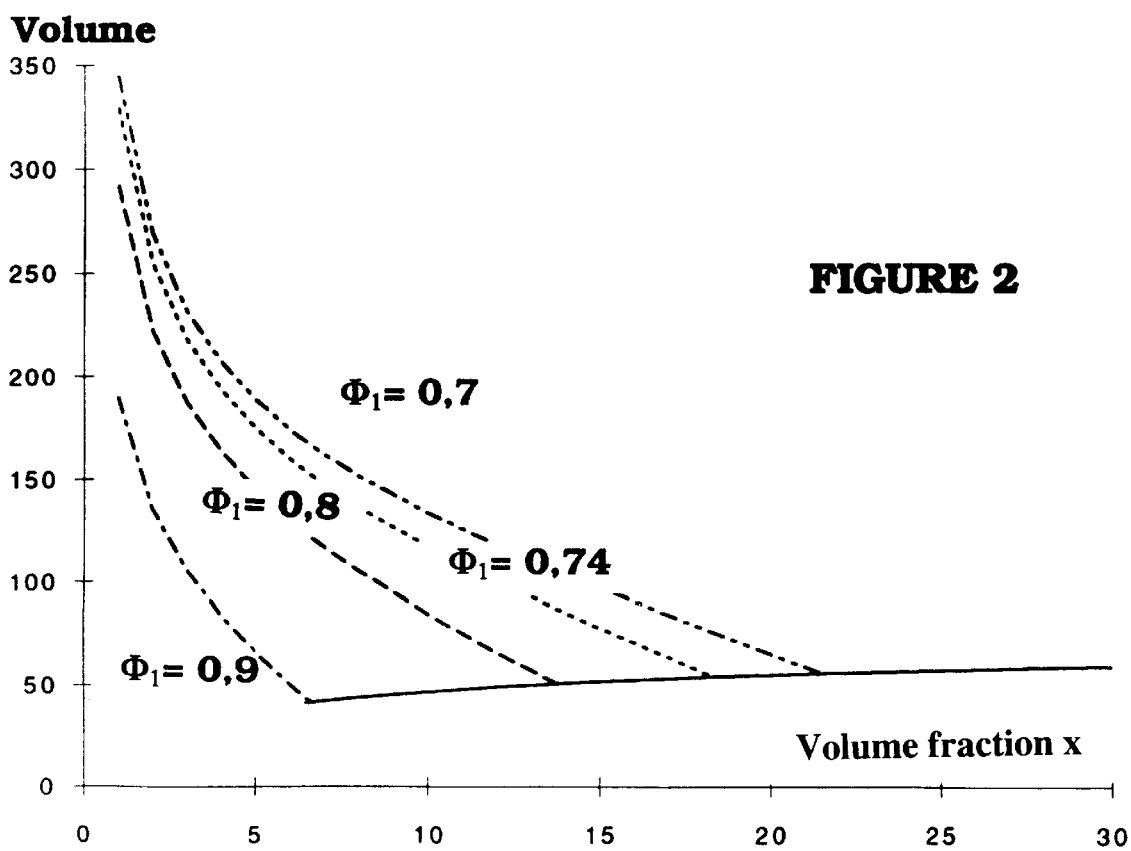
FIG. 2 is a curve showing the variation of the fluid loss volume (in ml) for various values of $\Phi_1$ as a function of the volume of latex added as fines.

FIG. 2 shows that the tendency remains exactly the same with finer particles such as latex, but with considerably reduced fluid loss volumes because of the smaller size.

In a second step, we checked the validity of the theoretical model on which the invention is based.

EXAMPLE 1

Fines Fraction=Latex

The first series of tests was carried out using a slurry with a coarse fraction which comprised a class G Portland cement (relative density 3.23; average particle diameter=$20\mu$) and, depending on the case, a sand A, essentially constituted by silica (relative density 2.65; average particle diameter= $200\mu$), a chromium oxide rich sand (relative density 4.5; average particle diameter=$300\mu$), and a finely ground quartz (relative density 2.65; average particle diameter=$7\mu$; reference E600 from Sifraco, France).

The fines fraction was formed of a styrene-butadiene latex (relative density 1, in a 50% by weight solution; average particle diameter $0.15\mu$; reference D600 from Schlumberger Dowell). The corresponding packing volume fraction $\Phi_2$ was 0.64.

A polynaphthalene sulfonate type dispersing agent (reference D80 from Schlumberger Dowell) was added to facilitate mixing.

The four formulations tested are shown below. The quantities of latex and dispersing agents added (indicated in grams) corresponded to 600 ml of slurry prepared with a volume of coarse fraction and water (the porosity was equal to the ratio of the volume of water to the total volume of the slurry, namely 600 ml); this corresponded to a volume fraction of x of solid latex. $\Phi_1$ corresponded to the packing volume fraction of the coarse fraction, $x_0$ was calculated using equation (4), $\rho_s$ and $\rho_c$ were respectively the density of the solid mixture and the slurry.

| | | Formulations (I) | | | | | | | | | |
|---|---|---|---|---|---|---|---|---|---|---|---|
| | | Coarse fraction (% by volume) | | | | | | | Dispersing | | |
| # | Cement | Sand A | Sand B | Ground quartz | $\Phi_1$ | Latex g | x % | $x_0$ % | agent g | Porosity % vol. | $\rho_s$ g/cm$^3$ | $\rho_c$ g/cm$^3$ |
| 1 | 100 | — | | — | 0.74 | 100 | 16.5 | 18 | 2 | 58 | 3.2 | 1.93 |
| 2 | 35 | 55 | | 10 | 0.87 | 40 | 5.3 | 9 | 5 | 40 | 2.9 | 2.11 |
| 3 | 100 | — | | — | 0.74 | 32 | 11.3 | 18 | 2 | 58 | 3.2 | 1.93 |
| 4 | 35 | 55 | | 10 | 0.87 | 16 | 2.1 | 9 | 5 | 40 | 2.9 | 2.11 |
| 5 | 30 | 15 | 45 | 10 | 0.92 | 40 | 5.3 | 5 | 4 | 40 | 3.9 | 2.71 |

Slurries 1 and 3 corresponded to prior art slurries, described in particular in European patent EP-A-0 273 471.

The rheology of the slurry (PV: Plastic viscosity, Ty: Yield point), fluid loss volume at 85° C. over 30 minutes, setting time and compression strength were measured under API (American Petroleum Institute) conditions.

The rheological and fluid loss measurements were carried out at a temperature of 85° C., corresponding to an average circulation temperature in a well (or Bottom Hole Circulation Temperature BHCT). Compression measurements were carried out at the static well bottom temperature (Bottom Hole Static temperature BHST).

Further, for each slurry tested, an indication is given as to whether the slurry was or was not gas tight and thus could (or could not) be used in a well with gas migration problems.

| | | | Results (I) | | | | |
|---|---|---|---|---|---|---|---|
| # | PV (Pa · s) | Ty (Pa) | FL (ml/30 min) | TT (h:mm) | BHST (° C.) | $CS_{24}$ (MPa) | Gas tight |
| 1 | 0.252 | 12.0 | 32 | 6:25 | 85 | 16 | yes |
| 2 | 0.230 | 7.2 | 28 | 2:50 | 85 | 26 | yes |
| 3 | 0.210 | 5.7 | 108 | 0:45 | 160 | 33 | no |
| 4 | 0.240 | 8.6 | 66 | 3:20 | 160 | 50 | no |
| 5 | 0.287 | 9.1 | 32 | 5:25 | 99 | 28 | yes |

For the same coarse fraction (same values of PVF $\Phi_1$ for the coarse fraction of the mixture), the fluid loss volume is directly linked to the volume of latex added. In contrast, as is clearly shown by comparing tests 1 and 2, it is possible to maintain very low fluid losses [the difference of 4 ml between the two fluid loss values is less than experimental error in this type of measurement] and use a much smaller quantity of latex, provided that the PVF $\Phi_1$ of the coarse fraction is optimised.

By thus minimising the quantity of latex required, a large part of the undesirable effects linked to the addition of large quantities of additives is overcome, in particular slowing of setting time (which has to be compensated in the prior art by adding a setting time accelerator, which in its turn causes certain of the properties of the slurry to be altered). The rheology of the slurry is also slightly improved. Still further, substantially higher compression strengths are obtained, indicating better cement quality (for average density slurries, a compression strength after 24 hours of at least 2000–3000 psi is required, i.e., about 15 MPa to 20 MPa).

As test 5 shows, when the volume of fines is higher than the value $x_0$, fluid loss is not improved any further.

EXAMPLE 2

Fines Fraction=Carbon Black

For this second series of tests, the fines fraction used was carbon black (relative density 1.99; average particle diameter $1\mu$). The packing volume fraction $\Phi_2$ was 0.70.

The coarse fraction in slurry #8 was hollow microspheres of the Cénosphères type—shown in the table below and in the other test series as spheres—(relative density 0.75; reference D124 from Schlumberger Dowell). The aim was to obtain a very light slurry for cementing, for example, a formation which could easily be fractured.

The measurements were carried out under the same conditions as those used for Example 1.

| | | | Results (II) | | | |
|---|---|---|---|---|---|---|
| # | PV (Pa · s) | Ty (Pa) | FL (ml/30 min) | BHST (° C.) | $CS_{24}$ (MPa) | Gas tight |
| 6 | 0.243 | 16.3 | 97 | 85 | not measured | yes |
| 7 | 0.203 | 3.8 | 106 | 160 | 40 | no |
| 8 | 0.196 | 8.6 | 48 | 160 | 16 | yes |

With carbon black, formed of particles which were far coarser than the latex, substantial degradations of performance were obtained but the fluid losses were considerably improved over compositions with no fluid loss control agent. Clearly, these compositions can be improved still further by adding a fluid loss control agent, in particular an anionic polymer derived from acrylamide.

It should be noted that for a slurry with as low a density as that of slurry 8, compression strengths of the order of 1000 psi (690 N/cm$^2$) were already considered to be satisfactory. The compositions of the invention are thus quite remarkable in this respect.

EXAMPLE 3

Fines Fraction=Red Mud

In this example, the fines fraction was constituted by red mud. The term red mud means the residual product from the Bayer process for preparing alumina from bauxite. The composition of the red mud depends on the bauxite mineral used and the treatment conditions, the principal constituents being alumina [18%–25%], silica [15%–25%], and ferric oxide [30–40%], from which the mud derives its red-brown color. The average particle diameter was about $1\mu$, with a value of $\Phi_2$ de 0.70. It should be noted, however, that a relatively large fraction of the red mud particles had a diameter which was much larger than the average diameter and thus strictly should be incorporated in the coarse fraction for the calculation, resulting in a de facto reduction in the value of $\Phi_1$.

| | Formulations (II) | | | | | | | | | |
|---|---|---|---|---|---|---|---|---|---|---|
| | Coarse fraction (% by volume) | | | | | | Dispersing | | | |
| # | Cement | Sand A | Ground quartz | spheres | $\Phi_1$ | $x_0$ | x % vol | agent (g) | Porosity (% vol.) | $\rho_s$ g/m$^3$ | $\rho_c$ g/cm$^3$ |
| 6 | 35 | 55 | | — | 0.83 | 13 | 10 | 10 | 40 | 2.8 | 2.05 |
| 7 | 35 | 55 | 7 | | 0.86 | 10 | 3 | 20 | 40 | 2.7 | 2.04 |
| 8[i] | 35 | — | | 55 | 0.83 | 13 | 10 | 30 | 40 | 1.8 | 1.46 |

[i]For this test, 5.0 g of a lignosulfate based retarding agent was also added to 600 ml of slurry.

| | Formulations (III) | | | | | | | | | |
|---|---|---|---|---|---|---|---|---|---|---|
| | Coarse fraction (% by volume) | | | | $x_0$ | $x$ | Dispersing agent | Porosity | $\rho_s$ | $\rho_c$ |
| # | Cement | Sand A | spheres | $\Phi_1$ | (%) | (% vol) | (g) | (% vol.) | (g/cm³) | (g/cm³) |
| 9 | 30 | | 55 | 0.80 | 15 | 15 | 15 | 40 | 1.9 | 1.53 |
| 10[j] | 35 | 55 | — | 0.78 | 16 | 10 | 20 | 40 | 2.9 | 2.15 |

[j]For this test 5.0 g of a lignosulfate based retarding agent was also added to 600 ml of slurry. Further, a dispersing agent comprising magnesium chloride and polynaphthalene sulfonate was used.

All measurements were made at 85° C.

| | Results (III) | | | | |
|---|---|---|---|---|---|
| # | PV (Pa · s) | Ty (Pa) | FL (ml/30 min) | TT (h:min) | Gas tight |
| 9 | 0.244 | 2.4 | 88 | n/m | no |
| 10 | 0.159 | 2.4 | 130 | 5:45 | no | installations, the burners are supplied with coal which has been powdered. The unburned fraction is vaporised in the chimneys and condenses, after cooling, in the form of finely-divided particles that are approximately spherical. The electrofilters in the chimneys capture all the particles of less than $200\mu$ and the grain-size distribution of the particles is about the same as that of an ordinary cement. After passage through the screen, in particular a 50 micron screen, the majority of the particles obtained have a diameter which is in the range 1 micron to 10 microns.

EXAMPLE 4

Other Fines Fractions

Three new types of fines fractions were used in this new series of tests. The packing volume fraction $\Phi_2$ was estimated to be close to 0.70 for these three materials. The types of fines fractions were:

- micro-silica—abbreviated to $\mu$ silica (relative density 2.4; average particle diameter $0.15\mu$);
- finely ground quartz, identical to that used in the preceding tests but with a solid mixture formulation such that this fraction constituted the fines fraction in the case under consideration;
- fly ash, filtered to $50\mu$—abbreviated to ash (relative density 2.4; average particle diameter $2\mu$).

Fly ash is a residual product from the combustion of coal, particularly in thermal power stations. In modern

| | Formulations (IV) | | | | | | | | | |
|---|---|---|---|---|---|---|---|---|---|---|
| | Coarse fraction (% by volume) | | | | | | Dispersing agent | Porosity | $\rho_s$ | $\rho_c$ |
| # | spheres | | | $\Phi_1$ | Fines | % | $x_0$ | (g) | (% vol.) | (g/cm³) | (g/cm³) |
| 11 | 23 | 43 | 13 $\mu$cement | 0.85 | $\mu$silica | 21 | 11 | 50[k] | 39 | 2.0 | 1.58 |
| 12 | 33 | 52 | — | 0.80 | quartz | 15 | 15 | 3 | 40 | 1.9 | 1.51 |
| 13 | 30 | 53 | 2 sand A | 0.78 | ash | 15 | 16 | 15 | 45 | 1.8 | 1.44 |

[k]The dispersing agent used here was a 40% solution of polymelamine sulfonate.

All measurements were made at 85° C., except for test 11 which was carried out under the cementing conditions of the head of a very deep offshore well: the slurry circulation temperature and bottom hole static well temperature was 4.4° C.

| | Results (IV) | | | | | | |
|---|---|---|---|---|---|---|---|
| # | PV (Pa · s) | Ty (Pa) | FL (ml/30 min) | TT (h:mm) | 500 psi (h:min) | $CS_{24}$ (MPa) | Gas tight |
| 11 | 0.149 | 1.4 | 28 | 8:18 | 12:00 | 36 | yes |
| 12 | 0.165 | 2.9 | 558 | not measured | not measured | not measured | no |
| 13 | 0.209 | 5.3 | 81 | not measured | 3:54 | 32 | no |

The examples reported above clearly show that it is always possible to minimise the fluid loss provided that the packing volume fraction of the coarse fraction is optimised.

Exact calculation of the packing volume fraction can prove to be very difficult when the interactions between the different particles are not negligible. It has been found that the Andreassen model could provide a very simple basis for optimising the value of $\Phi_1$ when the coarse fraction is constituted by an ensemble of particles which form a continuous size distribution.

Figure 3:
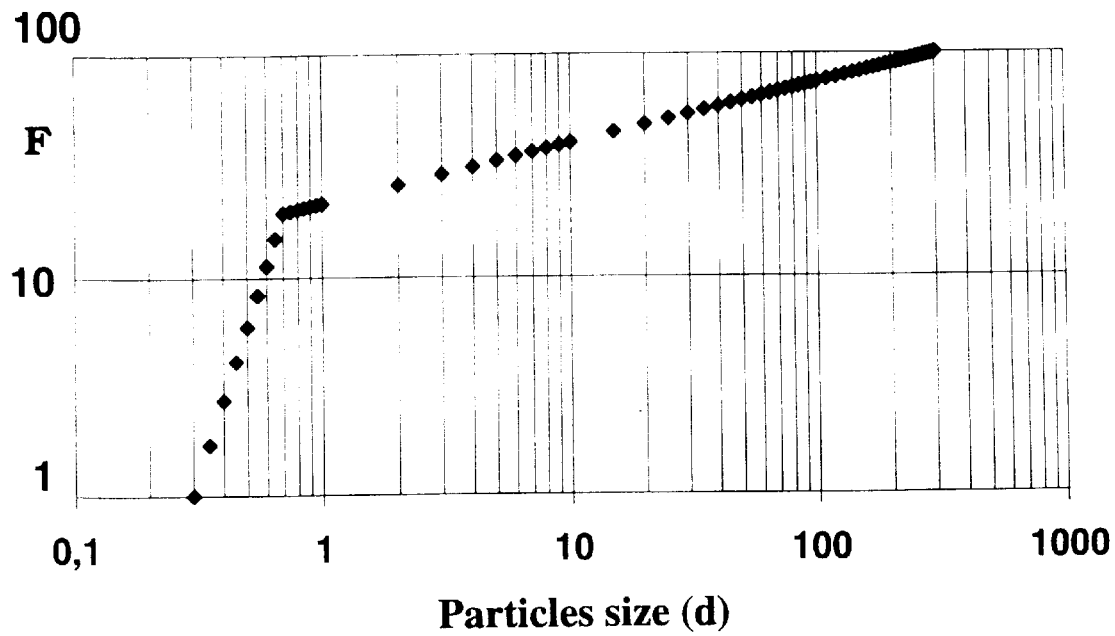
FIG. 3 is a graph showing the value of F as a function of particle size (in log-log co-ordinates), allowing the distribution coefficient to be determined.

In this case, if the (cumulative) percentage of particles which are smaller than a given size is shown in log-log co-ordinates, a curve is obtained with the shape shown in FIG. 3: from a given particle size, or pivotal size, the curve is of the type $F=(d/D)^q$, which conforms to the Andreassen equation. The pivotal size approximates to the existence of a minimum particle size in the mixture. In FIG. 3, the distribution coefficient q is given by the slope of the line.

Figure 4:
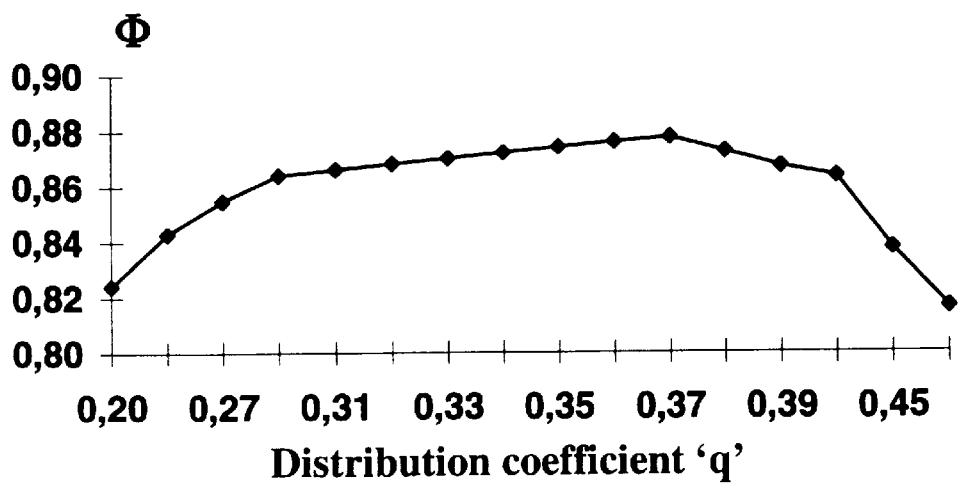
FIG. 4 is a graph showing the packing volume fraction as a function of the distribution coefficient of the mixture.

By calculating the value of the packing volume fraction $\Phi$ for different mixtures, the authors of the present invention have empirically established the existence of a relationship between q and $\Phi$. As can be seen in FIG. 4, it appears that any value of q between 0.3 and 0.4 leads to optimisation of $\Phi$, a maximum being obtained for q=0.37. It should be noted that if the selected mixture does not have continuous particle distribution, then a stepped curve rather than a single straight line is obtained. This representation thus makes it easy to check whether or not the conditions for applying the model are satisfied in each particular case.

Further, it has also been shown that the extent of the range of favorable values of q is narrower as the maximum particle size increases. In practice, the range 0.3–0.4 is suitable if the size of the largest particles of the solid mixture is close to $300\mu$. If the maximum size is of the order of $500\mu$, mixtures for which q is in the range 0.34 to 0.39 are preferably selected.

While empirical, these criteria offer a rough but reliable means of optimising the value of $\Phi_1$ for any mixture which could constitute the coarse fraction since programs exist for personal computers which can sum different grain-size curves and easily predict the shape of the distribution curve of any mixture simply by entering the volume fractions and distribution curves for each constituent.

What is claimed:

1. A well cement composition for use in performing cementing operations in a subterranean zone comprising a solid fraction of particles suspended in a liquid medium, the solid fraction consisting essentially of a coarse fraction and a fines fraction composed of fines particles having an average diameter less than 1 $\mu$m, the coarse fraction being comprised of the solid particles in the liquid medium other than the fines particles, the packing volume fraction $\Phi_1$ of the coarse fraction being greater than 0.8, and the solid volume fraction x of the fines particles being less than or equal to the volume fraction $x_0$ such that $$x_0 = \frac{\Phi_2(1-\Phi_1)}{\Phi_1 + \Phi_2(1-\Phi_1)}$$

in which $\Phi_2$ is the packing volume fraction of the species constituted solely by the fines particles.

2. The cement composition of claim 1 in which the fines particles composing the fines fraction have an average diameter which is less than $0.5\mu$.

3. The composition of claim 2 in which the packing volume fraction $\Phi_1$ is greater than 0.90.

4. The composition of claim 2 in which the solid particles in the coarse fraction comprise cement particles.

5. The composition of claim 3 in which the solid particles in the coarse fraction comprise cement particles.

6. A well cement composition for use in performing cementing operations in a subterranean zone prepared by suspending solid particles in a liquid medium to form a solid fraction in the liquid medium, the solid fraction consisting essentially of a coarse fraction and a fines fraction composed of fines particles having an average diameter less than $1\mu$, the coarse fraction being comprised of the solid particles in the liquid medium other than the fines particles, the packing volume fraction $\Phi_1$ of the coarse fraction being greater than 0.8, and the solid volume fraction x of the fines particles being less than or equal to the volume fraction $x_0$ which equals $$\frac{\Phi_2(1-\Phi_1)}{\Phi_1 + \Phi_2(1-\Phi_1)}$$

in which $\Phi_2$ is the packing volume fraction of the fines particles.

7. The cement composition of claim 6 in which the fines particles composing the fines fraction have an average diameter which is less than $0.5\mu$.

8. The composition of claim 7 in which the packing volume $\Phi_1$ is greater than 0.90.

9. The composition of claim 7 in which the solid particles in the coarse fraction comprise cement particles.

10. The composition of claim 8 in which the solid particles in the coarse fraction comprise cement particles.

* * * * *